United States Patent [19]

Kawashima et al.

[11] Patent Number: 5,168,445
[45] Date of Patent: Dec. 1, 1992

[54] AUTOMATIC ORDERING SYSTEM AND METHOD FOR ALLOWING A SHOP TO TAILOR ORDERING NEEDS

[75] Inventors: Kazuhiro Kawashima, Yokohama; Norihisa Komoda, Kawasaki; Masao Yagi, Kashiwa; Isao Tsushima, Yamato, all of Japan

[73] Assignee: Hitachi, Ltd., Tokyo, Japan

[21] Appl. No.: 313,614

[22] Filed: Feb. 21, 1989

[30] Foreign Application Priority Data

Mar. 4, 1988 [JP] Japan .................................. 63-49514

[51] Int. Cl.$^5$ ............................................. G06F 15/20
[52] U.S. Cl. ...................................... 364/403; 364/400
[58] Field of Search ................. 364/403, 400; 235/385

[56] References Cited

U.S. PATENT DOCUMENTS

| | | | |
|---|---|---|---|
| 4,345,147 | 8/1982 | Aaron et al. ......................... | 235/385 |
| 4,771,383 | 9/1988 | Takahashi ........................... | 364/405 |
| 4,782,451 | 11/1988 | Mazzarella et al. . | |
| 4,797,839 | 1/1989 | Powell ................................. | 364/423 |
| 4,887,206 | 12/1989 | Natarajan ............................ | 364/401 |
| 4,887,207 | 12/1989 | Natarajan ............................ | 364/401 |
| 4,958,280 | 9/1990 | Pauly et al. .......................... | 364/401 |

OTHER PUBLICATIONS

"Changing Market Structures and Information Technology", David W. Day, Industrial Market Management, pp. 13-16, 1976.
"Business Forecasts that are Automated: Smart Forecasts", Henry Fersko-Weiss, Personal Computing, vol. 10, No. 6, p. 168, 6186.

Primary Examiner—Gail O. Hayes
Attorney, Agent, or Firm—Fay, Sharpe, Beall, Fagan, Minnich & McKee

[57] ABSTRACT

An automated ordering system in a retail shop adapted to automatically order goods. In the system, a demand amount in the future is first supposed on the basis of an average of the past demands, the supposed future demand amount is corrected by the variable condition used to change the demand amount to predict a future demand amount, and the order amount is determined pursuant to a calculation formula on the basis of the predictive future demand amount and the stock volume of goods. Goods tend to be stocked in surplus or out of stock are diagnosed on the basis of the change of the past demands and the worker determines the amount of orders in respect to these goods.

28 Claims, 14 Drawing Sheets

FIG. 4

(APRIL, 63RD YEAR OF SHOWA)

| DATE OF SETTING / CONDITION OF SETTING | ... | 21 | 22 | 23 | 24 | 25 | 26 | 27 | 28 | 29 | ... |
|---|---|---|---|---|---|---|---|---|---|---|---|
| | ... | THUR. | FRI. | SAT. | SUN. | MON. | TUES. | WED. | THUR. | FRI. | ... |
| | ... | WORKDAY | WORKDAY | WORKDAY | HOLIDAY | WORKDAY | HOLIDAY | TWO DAYS BEFORE FESTIVAL | DAY BEFORE FESTIVAL | FESTIVAL | ... |
| WEATHER | ... | FINE | FINE | CLOUDY | RAINY | FINE | FINE | FINE | FINE | FINE | ... |
| EVENTS OF THE AREA | ... | T ELE- MENTARY SCHOOL ENTRANCE CEREMONY | | | T ELE- MENTARY SCHOOL ATHLETIC MEETING | | | | S JUNIOR HIGH SCHOOL ATHLETIC MEETING | T ELE- MENTARY SCHOOL EXCUR- SION | ... |
| | ... | | | | | | | | | | ... |
| OTHER SHOP | ... | Y MARKET CLOSING | | X RETAIL SHOP BARGAIN SALE | | Y MARKET CLOSING | | | X RETAIL SHOP CLOSING | | ... |
| | ... | | | | | | | | Y MARKET BARGAIN SALE | | ... |
| BARGAIN SALE | ... | | | | COOKIE G COOKIE | | | | CHOCOLATE | | ... |
| | ... | | | | | | | | | | ... |
| | ... | | | | | | | | | | ... |

| ITEM | SELLING DAY | --- | 21 | 22 | 23 | 24 | 25 | 26 | 27 | 28 | 29 | --- |
|---|---|---|---|---|---|---|---|---|---|---|---|---|
| CHOCOLATE | A CHOCOLATE | --- | --- | --- | --- | --- | --- | | | | | |
| CHOCOLATE | B CHOCOLATE | --- | 300 | 250 | 210 | 230 | 190 | | | | | |
| CHOCOLATE | C CHOCOLATE | --- | --- | --- | --- | --- | --- | | | | | |
| CHOCOLATE | D CHOCOLATE | --- | --- | --- | --- | --- | --- | | | | | |
| COOKIE | E COOKIE | --- | --- | --- | --- | --- | --- | | | | | |
| COOKIE | F COOKIE | --- | --- | --- | --- | --- | --- | | | | | |
| COOKIE | G COOKIE | --- | --- | --- | --- | --- | --- | | | | | |
| COOKIE | H COOKIE | --- | --- | --- | --- | --- | --- | | | | | |
| --- | --- | --- | --- | --- | --- | --- | --- | | | | | |

FIG. 6

| | |
|---|---|
| IF | "EXCURSION" OF "T ELEMENTARY SCHOOL" |
| THEN | "20"% INCREASE THE SELLING AMOUNT OF ITEM "CHOCOLATE" OVER "TWO" DAYS AND "ONE" DAY BEFORE EXCURSION |

— 601

| | |
|---|---|
| IF | "ATHLETIC MEETING" OF "S JUNIOR HIGH SCHOOL" |
| THEN | INCREASE THE SELLING AMOUNT OF ITEM "COOKIE" BY "100" PIECES OVER "THREE" DAYS AND "ONE" DAY BEFORE ATHLETIC MEETING |

| ITEM | PREDICTIVE DAY | --- | 21 | 22 | 23 | 24 | 25 | 26 | 27 | 28 | 29 | --- |
|---|---|---|---|---|---|---|---|---|---|---|---|---|
| CHOCOLATE | A CHOCOLATE | --- | --- | --- | --- | --- | --- | --- | --- | | | |
| CHOCOLATE | B CHOCOLATE | | | | | | | 200 | 220 | 240 | | |
| CHOCOLATE | C CHOCOLATE | | --- | --- | --- | --- | --- | --- | --- | | | |
| CHOCOLATE | D CHOCOLATE | | --- | --- | --- | --- | --- | --- | --- | | | |
| COOKIE | E COOKIE | | --- | --- | --- | --- | --- | --- | --- | | | |
| COOKIE | F COOKIE | | --- | --- | --- | --- | --- | --- | --- | | | |
| COOKIE | G COOKIE | | --- | --- | --- | --- | --- | --- | --- | | | |
| COOKIE | H COOKIE | | --- | --- | --- | --- | --- | --- | --- | | | |
| --- | --- | | --- | --- | --- | --- | --- | --- | --- | | | |

FIG. 8

| ITEM | | STOCK DAY / SAFE STOCK | ... | 21 | 22 | 23 | 24 | 25 | 26 | 27 | 28 | 29 | ... |
|---|---|---|---|---|---|---|---|---|---|---|---|---|---|
| CHOCOLATE | A CHOCOLATE | ... | ... | ... | ... | ... | ... | ... | | | | | |
| | B CHOCOLATE | 200 | ... | 200 | 240 | 220 | 260 | 300 | | | | | |
| | C CHOCOLATE | ... | ... | ... | ... | ... | ... | ... | | | | | |
| | D CHOCOLATE | ... | ... | ... | ... | ... | ... | ... | | | | | |
| COOKIE | E COOKIE | ... | ... | ... | ... | ... | ... | ... | | | | | |
| | F COOKIE | ... | ... | ... | ... | ... | ... | ... | | | | | |
| | G COOKIE | ... | ... | ... | ... | ... | ... | ... | | | | | |
| | H COOKIE | ... | ... | ... | ... | ... | ... | ... | | | | | |
| ... | ... | ... | ... | ... | ... | ... | ... | ... | | | | | |

FIG. 9

| ITEM | DAY | ... | 21 | 22 | 23 | 24 | 25 | 26 | 27 | 28 | 29 | ... |
|---|---|---|---|---|---|---|---|---|---|---|---|---|
| CHOCOLATE | A CHOCOLATE | ... | --- | --- | --- | --- | --- | | | | | |
| | B CHOCOLATE | ... | --- | --- | --- | 220 | 210 | | | | | |
| | C CHOCOLATE | ... | --- | --- | --- | --- | --- | | | | | |
| | D CHOCOLATE | ... | --- | --- | --- | --- | --- | | | | | |
| COOKIE | E COOKIE | ... | --- | --- | --- | --- | --- | | | | | |
| | F COOKIE | ... | --- | --- | --- | --- | --- | | | | | |
| | G COOKIE | ... | --- | --- | --- | --- | --- | | | | | |
| | H COOKIE | ... | --- | --- | --- | --- | --- | | | | | |
| ... | ... | | | | | | | | | | | |

ORDER SLIP

| ITEM | QUANTITY |
|---|---|
| A CHOCOLATE | 400 |
| B CHOCOLATE | 50 |
| E COOKIE | 100 |
| F COOKIE | 200 |

(a) ORDERING SCHEDULE

▽ ORDERING ($h_i$: ORDER AMOUNT)
▲ ARRIVAL ($h_{i-2}$: DELIVERY AMOUNT)

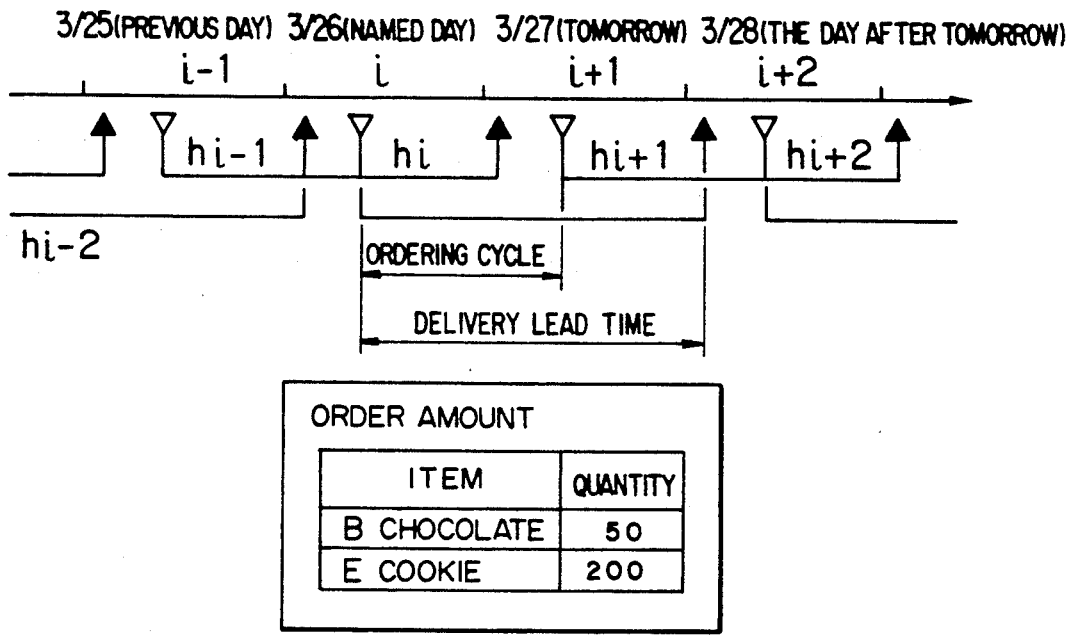

| ORDER AMOUNT | |
|---|---|
| ITEM | QUANTITY |
| B CHOCOLATE | 50 |
| E COOKIE | 200 |

(WHERE THE DELIVERY AMOUNT EQUALS THE ORDER AMOUNT ON TWO DAYS BEFORE THE NAMED DAY)

(b) ORDERING AMOUNT CALCULATING FORMULA

ORDER AMOUNT $h_i$ = {SALES VOLUME $V_i$ ON NAMED DAY + SALES VOLUME ON TOMORROW $V_{i+1}$ + SALES VOLUME ON THE DAY AFTER TOMORROW $V_{i+2}$}
− {RUN-OUT OF TOTAL STOCK ON THE PREVIOUS DAY $Z_{i-1}$ + DELIVERY AMOUNT ON NAMED DAY $h_{i-2}$ + DELIVERY AMOUNT ON TOMORROW $h_{i-1}$}
+ SAFE STOCK VOLUMES ($U_i$ : SALES VOLUME (PREDICTIVE VALUE)
$Z_i$ : STOCK VOLUME (ACTUAL VALUE)
$S$ : SAFE STOCK VOLUME (SET VALUE))

AUTOMATIC ORDERING SYSTEM AND METHOD FOR ALLOWING A SHOP TO TAILOR ORDERING NEEDS

BACKGROUND OF THE INVENTION

This invention relates to a system of ordering goods at a retail shop and more particularly to an automatic ordering system suitable for ordering work and inventory control of goods distributed daily, such as are sold in mass at a supermarket or the like, for which demand changes greatly.

As described in NIKKEI Communication, Jan. 4, 1988, pp. 68-72, in a conventional automatic ordering system, the inventory control caretaker, such as shop manager, precedently sets up a proper shop stock standard by considering the past results. An actual change of shop stock is collated with the shop stock standard so that when out-of-stock tends to occur, a supplemental order may be effected automatically. Otherwise, ordering new goods to replenish depleted inventory work is performed with reference to the experience and intuition of the person in charge of ordering.

In the conventional system, factors of change of demand are not considered with respect to individual goods. When the difference between shop stock standard and stock volume reaches a predetermined level, ordering is carried out automatically, with respect to goods for which demand changes greatly, a problem arises wherein goods being in great demand frequently become out of stock frequently while goods being in low demand are stocked in surplus.

SUMMARY OF THE INVENTION

An object of this invention is to provide an automatic ordering system which can enable the stock caretaker, such as a shop manager, to understand and utilize factors of changing demand for individual goods to assist him in the determination of the order amount to replenish inventory and diagnosis of the stock volume of individual goods in accordance with the condition or status of his own shop.

According to the invention, the above object can be accomplished by an automatic ordering system comprising means for storing, as time series data, factors of change of the sales volume of goods (variable condition), such events in the market area and other shops, means for storing prediction knowledge for predicting the amount of change of sales volume of goods and means for storing diagnosis knowledge for diagnosing whether the amount of orders and the volume of stock are abnormal on the basis of selling data (POS data) of goods and stock data. The system predicts the sales volume on the basis of the change factors and prediction knowledge stored in the storing means, and analyzes selling status of individual goods on the basis of the POS data, and diagnoses the order amount and stock volume. This diagnosis is made on the basis of analysis results and the diagnosis knowledge and provides a diagnostic message with respect the an item of goods for which the order amount and stock volume are abnormal.

The rule describing means can facilitate description, addition and correction of the knowledge for predicting the sales volume and diagnosing the order amount and stock volume, so as to permit the automatic ordering system of shop manager's own shop to adjust to comply with needs prevailing in the market area. The automatic ordering system can automatically calculate the order amount and deliver a diagnostic message with respect to a goods item, among a lot of goods, for which the order amount and stock volume are abnormal. Errors in prediction of the sales volume and diagnosis of the order amount can be lessened as compared to the conventional prediction and diagnosis performed under the command of experience and intuition of the shop manager, thereby ensuring ordering of new inventory in proper order amounts.

BRIEF DESCRIPTION OF THE DRAWINGS

FIG. 4 shows an example of variable condition data.

FIG. 5 shows an example of POS data.

FIG. 6 shows an example of a correction rule table.

FIG. 7 shows an example of predictive data.

FIG. 8 shows an example of stock data.

FIG. 9 shows an example of ordering data.

FIG. 12 shows an example of an order slip.

FIG. 13, consisting of (a) and (b), explains ordering work to which the invention is applied.

DESCRIPTION OF THE PREFERRED EMBODIMENTS

The invention will now be described by way of example and reference to FIGS. 1 to 14.

In ordering new goods to replenish depleted inventory work, lead time for procurement of delivered goods (hereinafter referred to as delivery lead time) is set and the delivery lead time is a few days after the date of ordering goods. Accordingly, it is necessary to forecast or predict the volume of sales occurring before the delivery lead time and determine the amount of orders (ordered goods) by taking into account the volume of inventories at an ordering time point and the safe total stock which is set to prevent out-of-stock. In case where the ordering cycle (equivalent to an interval of time between adjacent orders) is shorter than the delivery lead time, the amount of orders must be determined by additionally taking into account the amount of previously ordered goods which are scheduled to be delivered before the current delivery lead time.

In this embodiment of the invention, it is assumed that the ordering work is performed once every day in accordance with a daily ordering schedule as shown at (a) in FIG. 13 and that ordered goods are delivered two days after an ordering day (the day after tomorrow). It is also assumed that the ordering is cycle is shorter than the delivery lead time and the amount of orders is calculated using an ordering amount calculation formula as shown at (b) in FIG. 13.

An automatic ordering system according to this embodiment is supplied, in advance, with POS data indicative of actual results of selling and stock data indicative of actual stock of goods. The worker for ordering new goods to replenish depleted inventory inputs to the system (1) information about factors of change of sales volume such as events in the market area and items of goods on bargain sale at his own shop, (2) rules for correcting the volume of sales, which is affected by the factors of change, and (3) rules for diagnosing selling status and demand status. Following these steps, the system operates to determine the order amount of each good and automatically deliver an order slip.

Figure 1:
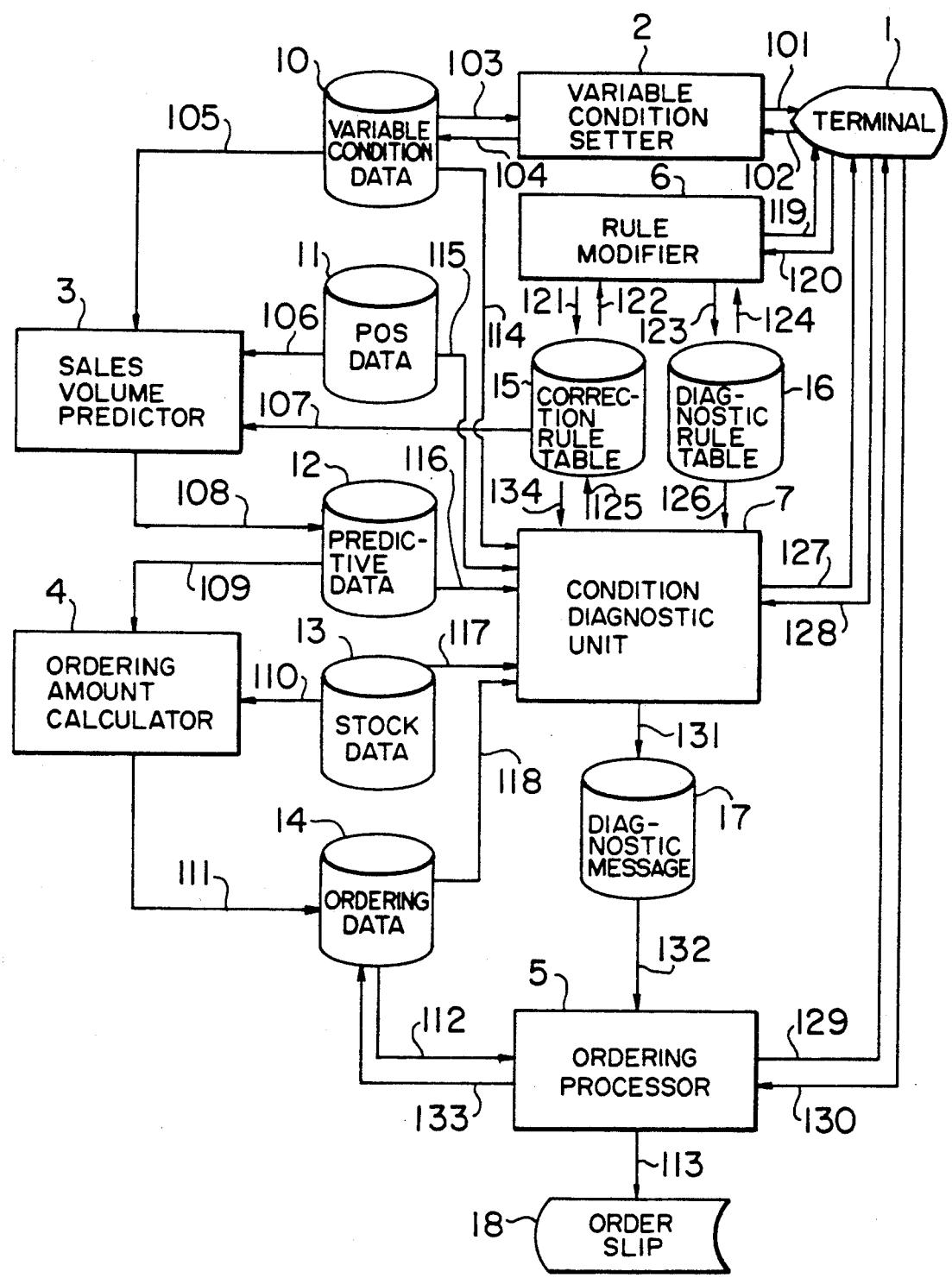
FIG. 1 is a schematic block diagram illustrating an embodiment of an automatic ordering system according to the invention.

The automatic ordering system is constructed as shown, in block form, in FIG. 1. Thus, this system comprises a terminal 1 through which input/output of information is effected by the worker; a variable condition setter 2 for setting variable condition data 10 indicative of factors of change; a sales volume predictor 3, responsive to variable condition data 10, POS data 11 and a correction rule table 15 for storing correction rules used to correct the sales volume, for predicting the volume of sales; an ordering amount calculator 4, responsive to predictive data 12 produced from the predictor 3, for calculating the amount of orders; a rule modifier 6 for modifying the correction rule table 15 and a diagnostic rule table 16 used to diagnose the condition of calculated ordering data 14 and stock data 13; a condition diagnostic unit 7 for diagnosing the condition in accordance with the diagnostic rule table 16; and an ordering processor 5, responsive to a diagnostic message 17 produced from the diagnostic unit 7 and ordering data 14, for delivering an order slip 18.

Figure 2:
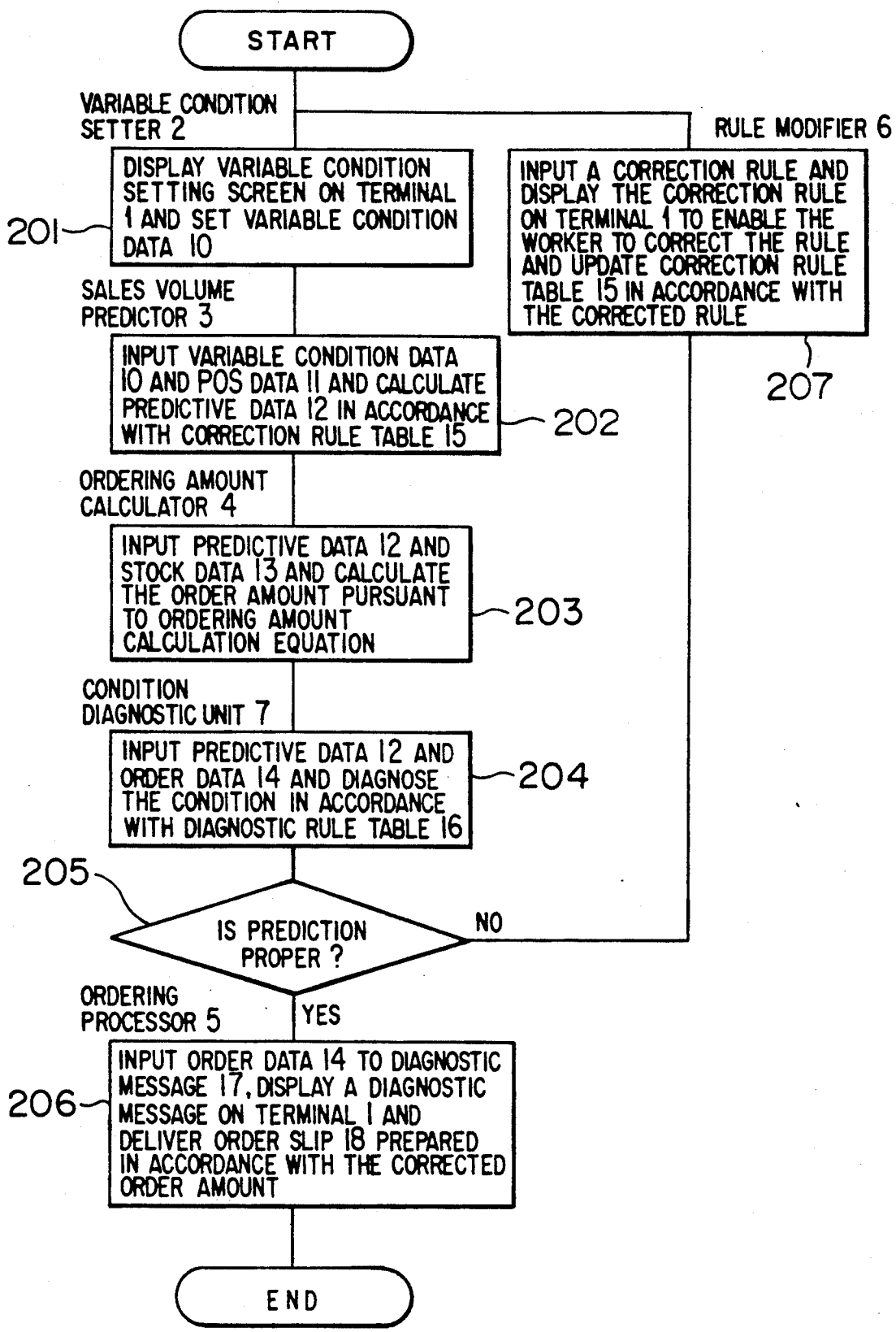
FIG. 2 is a flow chart showing the operation of the FIG. 1 system.

FIG. 2 shows a flow chart of the operation of the automatic ordering system.

With continuing reference to FIGS. 1 and 2, the variable condition setter 2 provides a variable condition setting screen which is sent via a signal line 101 and displayed on the terminal 1. The worker inputs information indicative of events in the market area and goods on sale at his own shop. The information is applied via a signal line 104 to the variable condition data 10, to either input new data representative of the variable condition valid for a few days which is necessary for predicting the volume of sales, or change the contents of the variable condition data (step 201).

Figure 3:
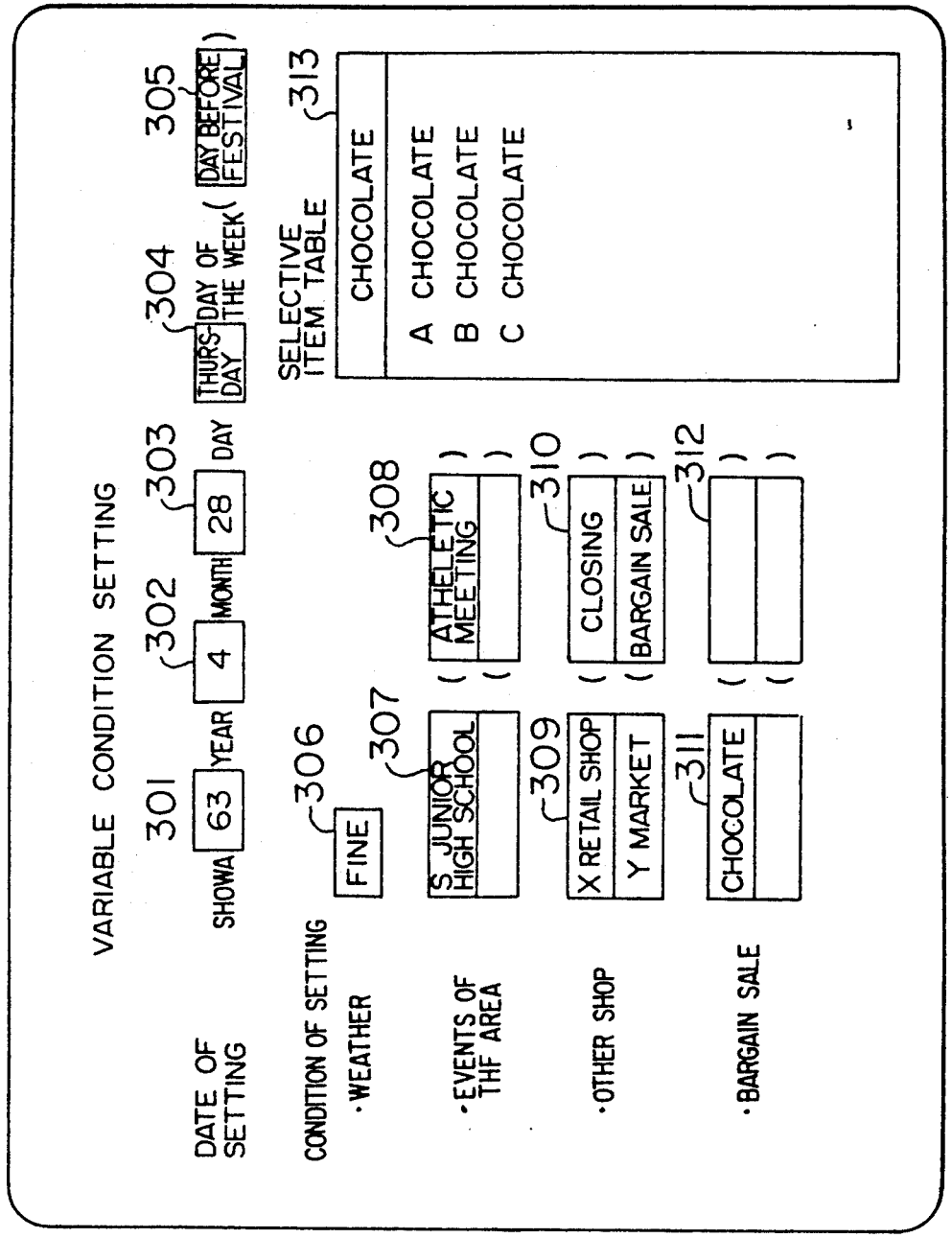
FIG. 3 shows a variable condition setting screen.

FIG. 3 shows an example of the variable condition setting screen and FIG. 4 shows an example of the variable condition data 10. Information about the calendar (day of the week and any holidays or festivals) has previously been stored in the variable condition data 10. In step 201, in order to input or change the variable condition necessary to predict the volume of sales, the worker first inputs a date of setting the variable condition at variable condition setting blanks 301, 302 and 303. As described previously, data indicative of a day of the week 402 and festival 403 and the variable condition inputted during a previous ordering work have previously been stored in the variable condition data 10.

With reference to FIGS. 1 through 4, the variable condition setter 2 fetches the data and variable condition corresponding to the inputted setting date 401 from the variable condition data 10 via a signal line 103 so as to display it on the variable condition setting screen. Items of information about weather 306, place 307 and name 308 of an event, name 309 and selling status (for example, shop closing and bargain sale) 310 of other shops, goods 311 on sale at the shop manager's own (for example, chocolate, cookie and curry) and trade name 312 are displayed at a selective item table 313 on the variable condition setting screen. The worker selects information items from the selective item table 313 and inputs them. The inputted information is then supplied via a signal line 102 to the variable condition setter 2 which in turn updates the contents of the variable condition data 10 or inputs new data thereto via the signal line 104.

The sales volume predictor 3 is then supplied with the updated or newly inputted contents of variable condition data 10 via a signal line 105, POS data 11 collected at a POS terminal via a signal line 106 and correction rule table 15 via a signal line 107 and it performs calculation to predict the sales volume. The variable condition data 10, POS data 11 and correction rule table 15 supplied to the sales volume predictor 3 are exemplified in FIGS. 4, 5 and 6, respectively.

The calculation of sales volume prediction is performed as will be described below. Example, prediction is based on the assumption that the date the date named is the 26-th day of the month and goods ordered on the 26-th day are scheduled to be delivered two days later i.e., on the 28-th day, thereby predicting on the named 26-th day the volume of sales expected to occur on the 28-th day.

Firstly, sales volumes which occurred previously on certain days, each being the same day of the week (Thursday) as that of the day for which the sales volume is predicted, i.e., the 28-th day, are averaged in respect of each item of goods. To explain with reference to FIG. 5, sales volumes, generally indicated by 503, which previously occurred on certain days, each being the same day of the week, are averaged in respect of an item of B chocolate. For example, the thus averaged predictive value is assumed to be "200".

Subsequently, the correction rules are activated by information from the variable condition data 10 to correct the predictive value. More specifically, with reference to FIGS. 4 and 6, due to the fact that the event 405 to be given on the "29-th" setting day is a "T elementary school excursion" as indicated in the variable condition data 10 of FIG. 4 and a correction rule 601 of FIG. 6 shows a "20% increase" in the volume of sales of "chocolate" under the above condition, the predictive value "200" is corrected so as to be 20% increased to "240" and the corrected value is stored into the predictive data 12 via a signal line 108 (step 202). An example of the predictive data 12 is shown in FIG. 7.

Subsequently, on the basis of the predictive value for the 28-th day (stored in the predictive data 12), ordering data 14 ordered on the past days (24-th and 25-th days) representative of the delivery amount for the 26-th and 27-th days and stock data 13, the ordering amount calculator 4 executes an ordering amount calculation formula as shown at (b) in FIG. 13 to determine the amount of orders. The amount of orders stored into the ordering data 14 via a signal line 111 (step 203). The stock data 13 is collected in advance using, for example, bar-code. FIG. 8 shows an example of the stock data 13 and FIG. 9 an example of the ordering data 14.

As an example, the calculation is carried out using numerical values of the data as follows: When Predictive sales volume for the named day (26-th) $V_i=200$ (FIG. 7), Predictive sales volume for tomorrow (27-th) $V_{i+1}=220$ (FIG. 7), Predictive sales volume for the day after tomorrow (28-th) $V_{i+2}=240$ (FIG. 7), Runout of total stock on the previous day (25-th) $Z_i=300$ (FIG. 8), Order amount on the named day (26-th) $h_{-2}=220$ (FIG. 9), Order amount on tomorrow (27-th) $h_{-1}=210$ (FIG. 9) and Safety stock volume $S=200$ are given, the order amount on the day after tomorrow (28-th) $h_i$ is given by $$\begin{aligned}
h_i &= \{V_i + V_{i+1} + V_{i+2}\} - \\
&\quad \{Z_i + h_{i-2} + h_{i-1}\} + S \\
&= \{200 + 220 + 240\} - \\
&\quad \{300 + 220 + 210\} + 200 \\
&= 130
\end{aligned}$$

The daily ordering work is carried out through the above operation (prediction and calculation of the order amount). Unless abnormal phenomena take place, the above procedure is sufficient. In many cases, however, various types of abnormal phenomena occur and the present invention is directed to the provision of the condition diagnostic unit 7 adapted to take into account the abnormal phenomena.

The condition diagnostic unit 7 is operable to perform the following procedure. Firstly, the condition diagnostic unit 7 is supplied with POS data 11, stock data 13 and diagnostic rule table 16 via signal lines 115, 117 and 126, respectively. Next, it analyzes the goods "tendency to sell" in order to know whether the volume of sales of individual goods groups and individual goods increases or decreases, by applying the mathematical method of "least squares" to the sales volume in POS data, with respect to individual goods groups and individual goods.

Figure 10:
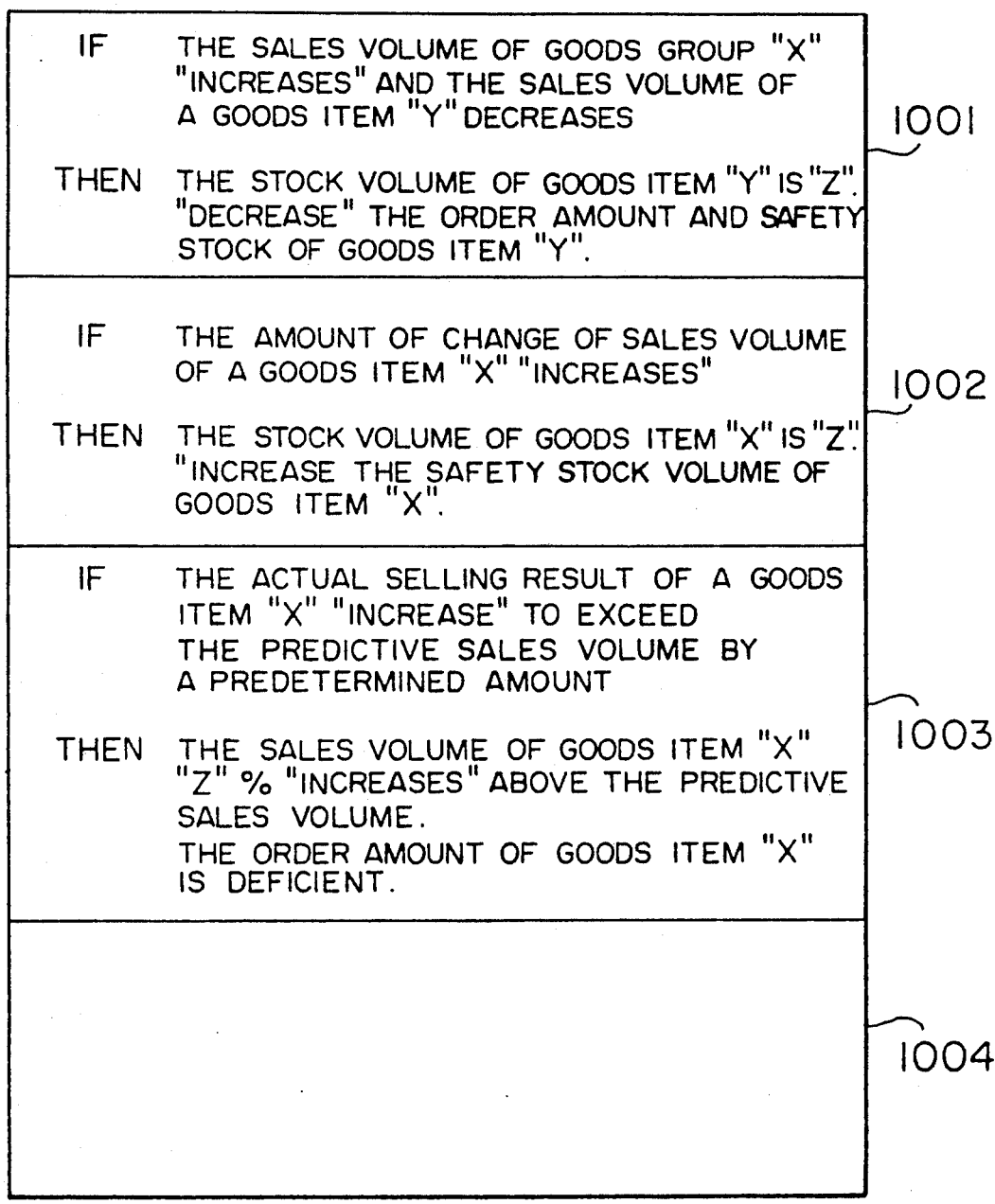
FIG. 10 shows an example of a diagnostic rule table.
Figure 11:
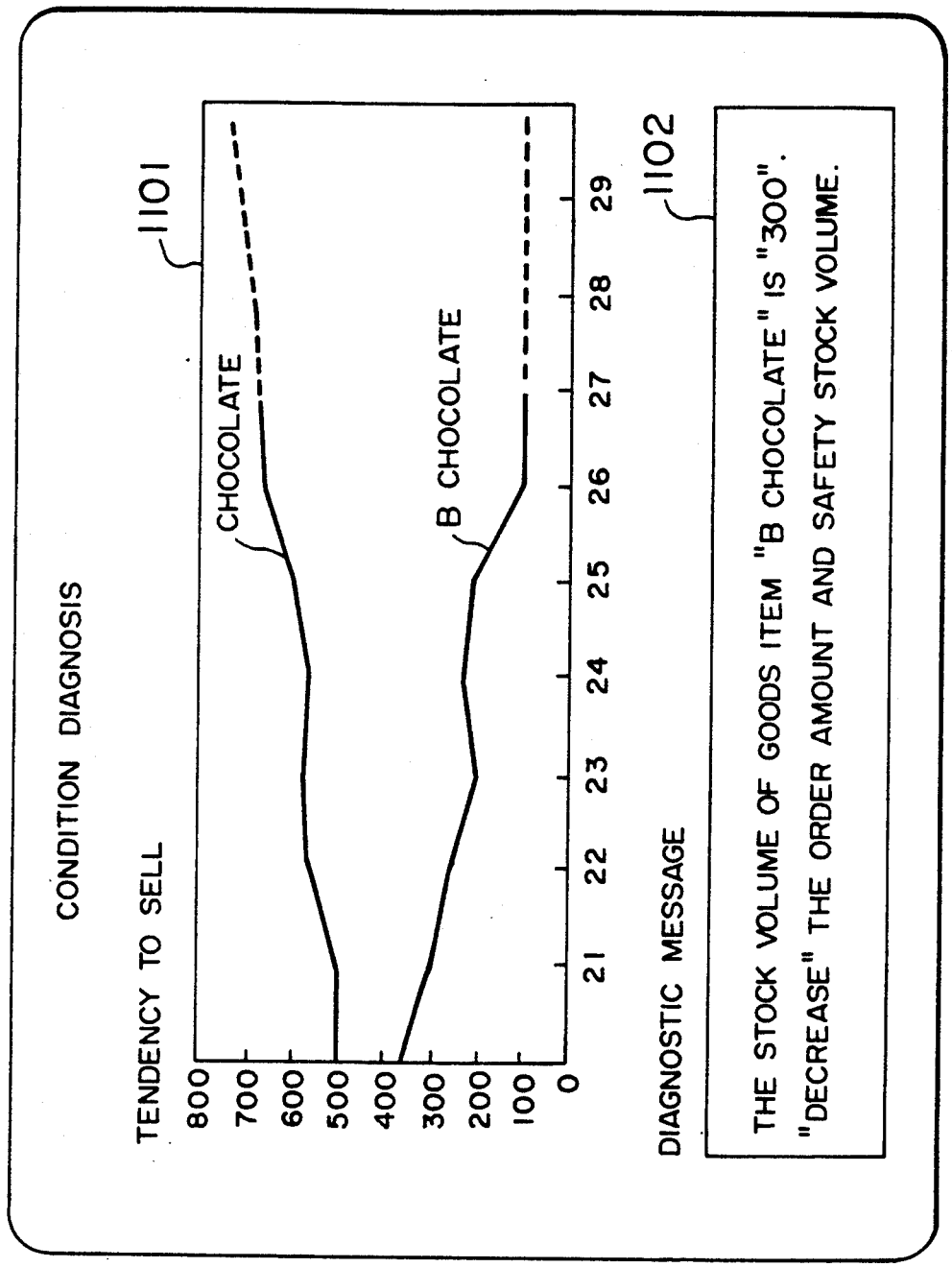
FIG. 11 shows a condition diagnostic screen.

The condition diagnostic unit 7 is also operable to activate the diagnostic rules so that a condition diagnostic screen may be sent via a signal line 127 to the terminal 1 and displayed thereon with respect to the individual goods group and individual goods which match the diagnostic rules. FIG. 10 shows an example of the diagnostic rule table and FIG. 11 shows an example of the condition diagnostic screen. The predicted value of the good's tendency to sell 1101 on the condition diagnostic screen of FIG. 11 indicates that in the POS data, the total sales volume of the goods group "chocolate" is increasing and the sales volume of the goods "B chocolate" is decreasing. Therefore a diagnostic rule 1001 shown in FIG. 10 is activated to display a diagnostic message 1102 on the condition diagnostic screen. Reversely, in case the total sales volume of "chocolate" is decreasing and the sales volume of "B chocolate" is increasing, a reverse diagnostic message in respect to 1102 is shown.

Furthermore, if the volume of sales of a goods item "X" changes to "increase" as indicated in a diagnostic rule 1002 shown in FIG. 10, the safety stock volume of the goods must be "increased" and a diagnostic message to this effect is stored in the diagnostic message 17. This is because the safety stock volume in the calculation formula shown at (b) in FIG. 13 is the term for absorbing the change (error) which is unforeseen. For example, if the safe stock volume is 200 as in the case of item 802 of "B chocolate" shown in FIG. 8, ordering is repeated such that 200 pieces of B chocolate are always in stock. Accordingly, for the difference between demand and prediction being about 200, no problem occurs, but when the difference exceeds 200, trouble occurs. In order to increase the safe stock volume, however, various conditions including stock space and budget must be checked. In the design of this embodiment, only a message "Increase the safe stock volume" is delivered.

Further, when a comparison of POS data 11 with the contents of predictive data 12 for the previous day shows an offset between these data which exceeds a predetermined value with respect to goods as indicated in a diagnostic rule 1003 in FIG. 10, the order amount of the goods item must be changed by the worker. This is especially true when the prediction misses greatly with respect to a certain good. Even in the presence of the offset, the difference, if not so large, may suitably be absorbed or cancelled out within two to three days by the safe stock, raising no problem but, if large, must be corrected. This is because, if the offset occurs successively, the wrong predictive value obtained on the previous day (in the above-described example, the 25-th day) is used to erroneously calculate amounts of supply goods for the named day (26-th) and the next day tomorrow (27-th) and there result erroneous order amounts for the named day (26-th) and the next day tomorrow (27-th). It may of course be conceivable to request correction of errors in the order amounts but the order once given to a supplier is difficult to correct. Accordingly, a better way to cope with the possible erroneous order amounts is to correct the amount of orders on the named day (the amount of delivered or supplied goods for the 28-th day) on the basis of the worker's judgement whether this offset will happen successively or not. To this end, in accordance with the invention, prediction and actual results of sales obtained on the previous day are constantly compared with each other so that an item of goods for which the difference exceeds a predetermined value may be picked up and a message indicative of the name of the goods item and the amount of difference may be stored in the diagnostic message 17.

In this manner, the condition diagnostic unit diagnoses to provide various diagnostic messages which are stored in the diagnostic message 17.

Subsequently, the ordering processor 5 fetches ordering data 14 and diagnostic message 17 via signal lines 112 and 132, respectively, and delivers an order amount and the diagnostic message to the terminal 1. The worker corrects the displayed order amount by locking up the diagnostic message. The ordering processor 5 fetches the corrected order amount via a signal line 130 to update the ordering data 14 and delivers an order slip 18. FIG. 12 shows an example of the order slip. The worker consults the diagnostic message 1102 to correct the order amount, generally indicated by reference numeral 903 and calculated to be "130" by the ordering amount calculator, to "50" for "B chocolate" in item 1201 of the order slip of FIG. 12.

The condition diagnostic unit 7 also functions to correct the correction rule table 15 if there is a large difference between predictive data and results. For example, if in spite of the fact that the correction rule prescribes a 20% increase in sales volume of item "chocolate" under the condition of "T elementary school" and "excursion", the actual sales result measures a 35% increase, the 20% increase rule does not reflect the actual condition and must be corrected.

There are two main ways of making such a correction. One to obtain values through a presumption method by which the square sum of differences between actual results and predictive amounts is minimized and to establish a new rule by using the thus obtained values. The other is to obtain values through weighted average of values estimated by the method of least squares and values by the current rule and to establish a new rule by using the thus obtained values. Subsequently, the rule modifier 6 sends a modified correction rule to the terminal 1 via a signal line 119 so that the modified correction rule containing the corrected values are displayed emphatically, such as in a different color. The worker can modify the correction rule thus displayed on the terminal 1, as necessary. The rule modifier 6 updates the correction rule table 15 via a signal line 121 (step 207). The operations in steps 201 to 204 are repeated until correct prediction can be obtained.

As described above, since in the automatic ordering system of this embodiment the variable condition setter 2 is operative to store the inputted variable condition into the variable condition data 10, the worker can grasp factors of change of the past sales amount. Knowing the factors of change, the worker can easily modify correct or add to the correction rules so that the amount of change of sales volume may be incorporated in the correction rule table 15. When the worker simply inputs the variable condition representative of events about to be given, the sales volume of individual goods groups and individual goods, which complies with various events, can automatically be predicted and the order amount complying with the variable condition can be calculated on the basis of prediction results with respect to individual goods. Further, diagnostic rules used to provide a diagnostic message indicative of discrepancy between selling status and stock status are stored in the diagnostic rule table 16 and the worker can easily correct or add to the diagnostic rules. Among a set of goods, only goods having a discrepancy between selling status and stock status can be selected in accordance with the diagnostic rule to provide a proper diagnostic message. The message enables the worker to grasp the stock status and selling status of only the questionable goods and to determine proper order amounts.

Figure 14:
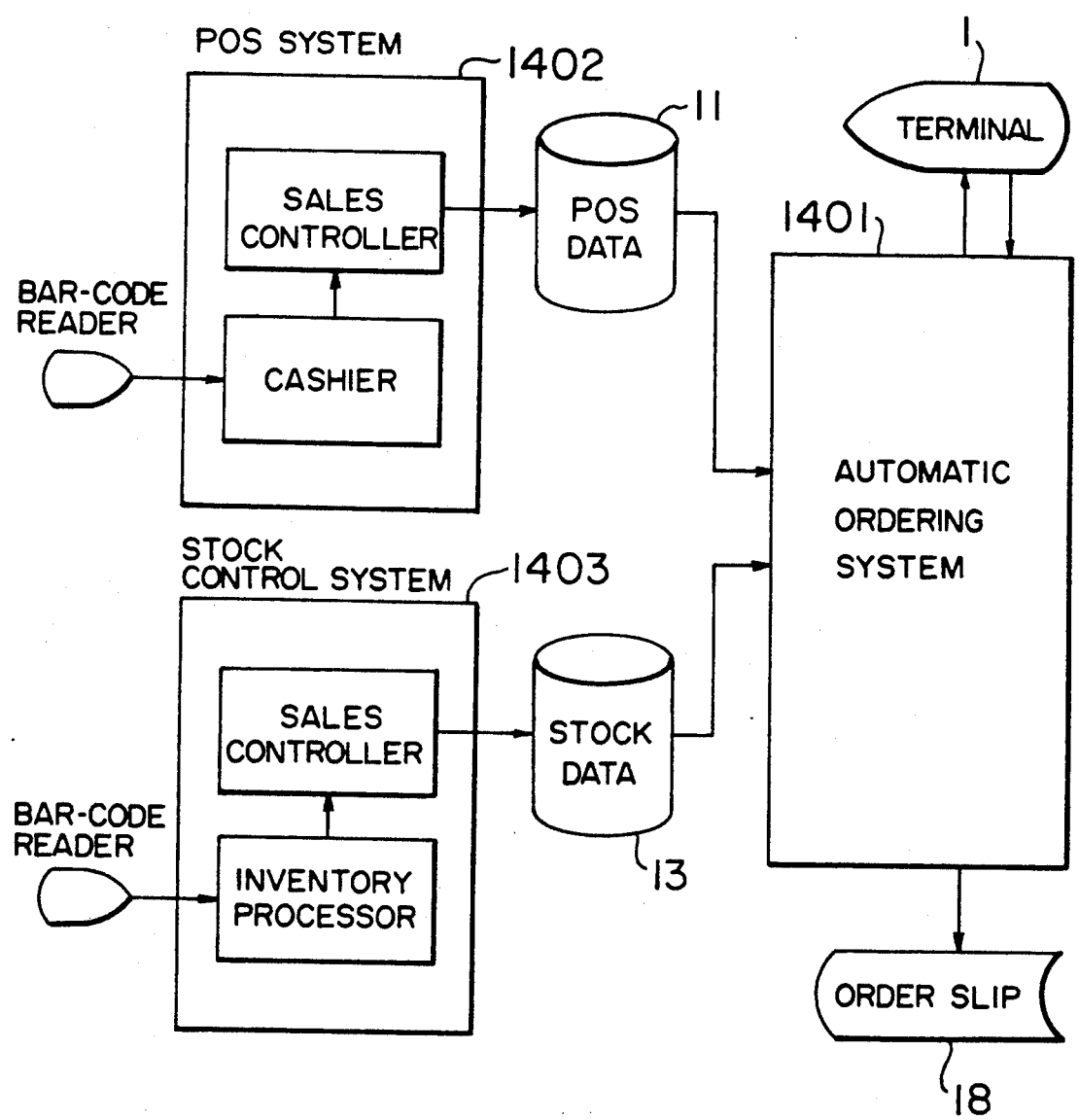
FIG. 14 is a block diagram illustrating an example of a retail shop system to which the invention is applied.

The foregoing embodiment has been described as being directed to ordering new goods to replenish depleted inventory but by connecting the automatic ordering system 1401 to a POS system 1402 for controlling the sales volume via the POS data 11 and a stock control system 1403 for controlling the stock volume by using bar-codes and the like via the stock data 13, a retail shop system for controlling the whole route covering sales and arrival/delivery of goods may be constructed as shown in FIG. 14.

In alternative embodiments, the variable condition setter 2 may be previously inputted with a variable condition valid for a period of time to permit the sales volume predictor 3 to predict the volume of sales for that period of time, thereby delivering a sales plan. The condition diagnostic unit 7 may calculate the amount of change of selling on the basis of the past contents of the POS data 11 to automatically correct safety stock volume 803 of the stock data 13. Further, the sales volume predictor 3 operative to average sales volumes over a few days of the same day of the week in this embodiment may be so modified as to perform the prediction by averaging sales volumes over a month or a week. In addition, in the diagnostic rule table 16, some rules may be activated preferentially, some rules interfering with each other may be prevented from activation or some rules to which priority is given by the work may be activated preferentially, with a view of improving efficiency of diagnostic process.

In addition to the ordering work mode described in the foregoing embodiment wherein ordering is done every day and delivery is received two days after an order date, a fixed period ordering mode may be adopted wherein ordering is done not every day but at an interval of a few days. Alternatively a fixed quantity ordering mode may be adopted wherein the order amount is fixed, or a mode wherein the lead time is different for individual items of goods or individual seasons. The present invention may similarly be applied to these ordering modes by simply changing the ordering amount calculation formula and the contents of the diagnostic rule table.

Further, in addition to controlling of goods suitable for stock (chocolate) exemplified in the foregoing embodiment, goods unsuited for stock, such as perishable foods, may be controlled similarly in accordance with the present invention by using a modified ordering amount calculation formula:

order amount $h_i$ = sales volume for tomorrow $U_{i+1}$ (predictive volume)

According to the invention, by inputting the variable condition representative of events in the market area by making the most of worker's, and particularly, shop manager's knowledge, the amount of change of selling of individual goods can automatically be reflected on the order amount. Accordingly the amount of orders of goods expected to be sold at own shop can be increased to enable the store manager's own shop to increase the amount of sales in accordance with the market condition. Also, selling status and stock status can automatically be diagnosed in respect of individual goods groups and individual goods by making the most of a worker's, such as a shop manager's, knowledge and therefore surplus order of goods not expected to be sold can be prevented, thereby promoting economy. Further, a diagnostic message is provided with respect to only goods of which the order amount is questionable among a lot of goods, thereby promoting efficiency of ordering work. Moreover, the sales volume can be predicted accurately on the basis of the variable condition representative of schedules of events and the like over a month or a year to prepare a monthly or yearly selling plan. This ensures preparation of a business plan and efficient conduction of business at the shop.

What is claimed is:

1. An automatic ordering system, adapted to determine an order quantity for procuring various resources sold in mass at a supermarket or the like by generating an order command, said system comprising:
    variable condition data storage means for storing condition data reflecting variable sales conditions including weather, entertainment, events at competitive shops or bargain sales;
    point of sale data storage means for storing point of sale data comprising actual results of historical selling of the various resources;
    correction rule table storage means for correction rules for correcting initial predicted sales volumes based on average sales conditions;
    stock data storage means for storing stock data representative of on-hand resources;
    ordering data storage means for storing ordering data;
    sales volume predictor means operatively associated with said variable condition data storage means, said point of sale data storage means and said correction rule table storage means for predicting a future demand for the various resources on the basis of the condition data, the point of sale data, and the correction rules and storing the predicted future demand as predictive data in a predictive data storage means;

ordering amount calculating means operatively associated with said predictive data storage means and said stock data storage means for determining an order amount of the various resources based on the predictive data and the stock data, and for writing the order amount to the ordering data storage means as said ordering data; and, ordering processor means operatively associated with said ordering data storage means for ordering said determined order amount by generating an order command to thereby effect an inventory control.

2. The automatic ordering system according to claim 1 further comprising:

stock condition diagnostic means for a) determining whether the stock data and the order amount determined by said ordering amount calculating means are proper and b) selecting a goods item to be particularly noticed by said inventory control caretaker in charge of individual order amounts of individual goods among said various resources; and, display means for emphatically displaying the individual order amounts of said selected goods item.

3. The automatic ordering system according to claim 1 wherein said ordering processor means includes means for generating an order slip for use by an inventory control caretaker as said order command.

4. An automatic ordering system for generating an order command to procure sales items thereby effectuating an automatic inventory control, the system comprising:

variable condition data storage means for storing condition data reflecting variable sales conditions causing changes in demand quantity for the sales items including weather, entertainment, events at competitive shops or bargain sales;

point of sale data storage means for storing point of sale data comprising an average of past demand quantities of the sales items;

correction rule storage means for storing correction rules relating the variable condition data to the changes in demand quantity;

sales volume predictor means for generating provisional future demand quantity data for selected ones of the sales items based on said point of sale data modified by the variable condition data according to the correction rules; and, ordering amount calculator and processing means for ordering inventory according to the future demand quantity data generated and said stock data by generating an order command, thereby effectuating said automatic inventory control.

5. The automatic ordering system according to claim 4 further comprising:

interactive rule correction means for enabling said inventory control caretaker to manually modify said correction rules stored in said correction rule storage means; and, automatic rule modifier means for automatically modifying the correction rules stored in said correction rule storage means based on the past demand quantities of said sales items and said variable condition data.

6. The automatic ordering system according to claim 4 further comprising:

prioritizing means for assigning priority to preselected correction rules stored in said correction rule storage means; and, selecting means for selecting ones of said correction rules in accordance with the assigned priority and for predicting said provisional future demand quantity.

7. The automatic ordering system according to claim 4 wherein said ordering amount calculator and processing means includes means for generating an order slip for use by an inventory control caretaker as said order command.

8. An automatic ordering system adapted to determine an order quantity and procure various resources sold in quantity at a supermarket retail store or the like, the system comprising:

variable condition data storage means for storing condition data reflecting variable sales conditions including weather, entertainment, events at competitive shops or bargain sales;

point of sale data storage means for storing POS data comprising actual results of historical selling of the various resources;

correction rule table storage means for storing correction rules for correcting initial predicted sales volumes based on average sales conditions;

stock data storage means for storing stock data representative of on-hand resources;

ordering data storage means for storing ordering data;

sales volume predictor means operatively associated with said variable condition data storage means, said point of sale data storage means and said correction rule table storage means for predicting a future demand amount for the various resources on the basis of the condition data, the POS data, and the correction rules and storing the predicted future demand as predictive data in predictive data storage means;

ordering amount calculating means operatively associated with said stock data storage means and said predictive data storage means for determining an order amount of the various resources based on the predictive data and the stock data, and for writing the order amount to the ordering data storage means as said ordering data;

ordering processor means operatively associated with said ordering data storage means for ordering said determined order amount to thereby effect said inventory control;

diagnostic message storage means for storing a diagnostic message;

means for describing a diagnosis knowledge for relating whether said stock data and said order amount are at predetermined proper values; and, condition diagnostic unit means operatively associated with said stock data storage means and said ordering data storage means for diagnosing whether said stock data and said order amount are at first predetermined appropriate levels based on said described diagnosis knowledge and for retrieving said diagnostic message when the stock data and the order amount are not at the first predetermined appropriate levels.

9. The automatic ordering system according to claim 8, further comprising:

means for displaying the diagnostic message stored in said diagnostic message storage means; and, manual correcting means for enabling said inventory control caretaker on said system to correct the order amount determined by said ordering amount calculating means as a corrected order amount.

10. The automatic ordering system according to claim 7 wherein said condition diagnostic unit means includes means for calculating a tendency of stock demand to increase or decrease for said various resources by performing a diagnosis calculation, said automatic ordering system further comprising:

means for storing the tendency;

diagnostic rule storage means for storing tendency rules by which the tendency of the demand amount to increase or decrease is related to the stock data and said order amount of said various resources which are to be checked for their abnormality; and, means for checking whether the stock data and said order amount of the various resources are proper based on said tendency rules.

11. The automatic ordering system according to claim 10 wherein said tendency rules comprise a rule such that when an individual goods item in a goods group for which the predicted future demand amount is increasing, tends to decrease in demand at said store, said individual goods item is diagnosed as being abnormal.

12. The automatic ordering system according to claim 10 wherein said tendency rules comprise a rule such that when an individual goods item in a goods group for which the predicted future demand amount is decreasing, tends to increase in demand at said store, said individual goods item is diagnosed as being abnormal.

13. The automatic ordering system according to claim 10 wherein said tendency rules comprise a rule such that an individual goods item for which the predicted future demand amount changes greatly is diagnosed as being abnormal.

14. The automatic ordering system according to claim 10 wherein said tendency rules comprise a rule such that an individual goods item for which the difference between a predictive demand amount and actual sales results is large, is diagnosed as being abnormal 15. The automatic ordering system according to claim 10 further comprising rule correction means for enabling said inventory control caretaker on said system to correct, as desired, the diagnostic rules stored in said diagnostic rule storage means.

16. The automatic ordering system according to claim 10 further comprising means for giving priority to applicable diagnostic rules stored in said diagnostic rule storage means, and means for selecting the applicable rules in accordance with the priority and performing the diagnosis.

17. The automatic ordering system according to claim 8, further comprising:

diagnosing means for diagnosing the validity of said stock data and said order amount.

18. The automatic ordering system according to claim 8 wherein said ordering processor means includes means for generating an order slip for use by an inventory control caretaker.

19. A method of operating an inventory control apparatus for inventory control by automatically determining and ordering an amount of goods necessary to replenish an inventory to effectuate the inventory control, the method comprising the steps of:

building a historical data base of historical data, said historical data base based on past sales of the goods;

storing said historical data base in a central processing unit of said inventory control apparatus;

building a modifier data base of modifiers, said modifier data base including factors affecting demand over long periods of time, comprising seasonal or holiday demand, and factors influencing demand over very short-term events including a sale at a competing shop and weather conditions;

storing said modifier data base in the central processing unit of said inventory control apparatus;

building a stock data storage table of stock data representative of on-hand sales goods;

storing said stock data storage table in the central processing unit of said inventory control apparatus;

modifying an order amount suggested by the historical data base by information stored in the modifier data base;

calculating an actual order amount based on the modified order amount and the stock data; and, ordering said actual order amount to thereby effectuate said inventory control.

20. The method according to claim 19 further comprising the step of, after modifying the order amount, printing an order slip of the actual order amount of sales goods needed to replenish inventory.

21. An automatic ordering system for replenishing inventories of goods a demand for which rapidly changes to effect an inventory control, said automatic ordering system comprising:

diagnostic means for describing diagnostic knowledge for diagnosing whether an inventory of an individual good and an order amount for the individual good are within a predetermined proper range, said diagnostic means including means for calculating a tendency of said demand to increase or decrease for said individual good;

tendency data storage means for storing tendency data representative of said tendency within the system;

diagnostic rule storage means for storing diagnostic rules by which said tendency is related to the inventory and the order amount of the individual good and which is to be checked for its abnormality;

means for checking whether the inventory and the order amount are proper on the basis of said diagnostic rules;

means for displaying a diagnostic message and the order amount then the inventory and the order amount are checked as being improper;

means for updating the order amount by an inventory control caretaker as a corrected order amount; and, means for ordering said corrected order amount to effect said inventory control.

22. The automatic ordering system according to claim 21 wherein said means for ordering the corrected order amount includes means for generating an order slip for use by an inventory control caretaker.

23. An automatic ordering method for use with an inventory control apparatus to procure various resources sold in mass at a supermarket or the like by generating an order command, said method comprising the steps of:

storing condition data reflecting variable sales conditions including weather, entertainment, events at competitive shops or bargain sales in a variable condition data storage means of said inventory control apparatus;

storing point of sale data comprising actual results of historical selling of the various resources in a point of sale data storage means of said inventory control apparatus;

storing, in a correction rule table storage means of said inventory control apparatus, correction rules for correcting initial predicted sales volumes based on average sales conditions;

storing stock data representative of on-hand resources in a stock data storage means of said inventory control apparatus;

storing ordering data in an ordering data storage means of said inventory control apparatus;

predicting, in a sales volume predictor means operatively associated with said variable condition data storage means, said point of sale data storage means and said correction rule table storage means, a future demand for the various resources on the basis of the condition data, the point of sale data, and the correction rules and storing the predicted future demand as predictive data in a predictive data storage means of said inventory control apparatus;

determining, in an ordering amount calculating means operatively associated with said predictive data storage means and said stock data storage means, an order amount of the various resources based on the predictive data and the stock data, and writing the order amount to the ordering data storage means as said ordering data; and, ordering, in an ordering processor means operatively associated with said ordering data storage means, said determined order amount by generating an order command to thereby effect an inventory control.

24. The automatic ordering method according to claim 23 further comprising the steps of:

determining in a stock condition diagnostic means of the inventory control apparatus whether the stock data and the order amount determined by said ordering amount calculating means are proper and selecting a goods item to be particularly noticed by said inventory control caretaker in charge of individual order amounts of individual goods among said various resources; and, emphatically displaying the individual order amounts of said selected goods item on display means of said inventory control apparatus.

25. An automatic ordering method for use with an inventory control apparatus to procure sales items thereby effectuating an automatic inventory control, the method comprising the steps of:

storing, in a variable condition data storage means of the apparatus, condition data reflecting variable sales conditions causing changes in demand quantity for the sales items including weather, entertainment, events at competitive ships or bargain sales;

storing, in a point of sale data storage means of the apparatus, point of sale data comprising an average of past demand quantities of the sales items;

storing, in a correction rule storage means of the apparatus, correction rules relating the variable condition data to the changes in demand quantity;

generating, in a sales volume predictor means of the apparatus, provisional future demand quantity data for selected ones of the sales items based on said point of sale data modified by the variable condition data according to the correction rules; and, ordering, in an ordering amount calculator and processing means of the apparatus, inventory according to the future demand quantity data generated and said stock data by generating an order command, thereby effectuating said automatic inventory control.

26. The automatic ordering method according to claim 25 further comprising the steps of:

modifying, through an interactive rule correction means of said apparatus, said correction rules stored in said correction rule storage means; and, automatically modifying, by an automatic rule modifier means of said apparatus, the correction rules stored in said correction rule storage means based on the past demand quantities of said sales items and said variable condition data.

27. The automatic ordering method according to claim 25 further comprising the steps of:

assigning priority, by a prioritizing means of the apparatus, to preselected correction rules stored in said correction rule storage means; and, selecting, in a selecting means of the apparatus, ones of aid correction rules in accordance with the assigned priority and predicting said provisional future demand quantity.

28. An automatic inventory ordering method for use with an inventory control apparatus, the method comprising the steps of:

describing diagnostic knowledge for diagnosing whether an inventory of an individual good and an order amount for the individual good are within a predetermined proper range;

calculating a tendency of a demand for said individual good to increase or decrease;

storing tendency data representative of said calculated tendency in a tendency data storage of the apparatus;

storing, in a diagnostic rule storage of the apparatus, diagnostic rules by which said tendency is related to the inventory and the order amount of the individual good and which is to be checked for its abnormality;

checking whether the inventory and the order amount are proper on the basis of said diagnostic rules;

displaying a diagnostic message when the inventory and the order amount are checked as being improper;

updating the order amount as a corrected order amount; and, ordering said corrected order amount to effect said inventory control.

* * * * *

UNITED STATES PATENT AND TRADEMARK OFFICE
CERTIFICATE OF CORRECTION

PATENT NO. : 5,168,445
DATED : December 1, 1992
INVENTOR(S) : Kazuhiro Kawashima, et al.

It is certified that error appears in the above-identified patent and that said Letters Patent is hereby corrected as shown below:

Claim 1, column 8, line 55, after "for" insert --storing--.

Claim 25, column 13, line 59, delete "ships" and replace with --shops--.

Claim 27, column 14, line 34, delete "aid" and replace with --said--.

Signed and Sealed this

Nineteenth Day of October, 1993

Attest:

BRUCE LEHMAN

*Attesting Officer*  *Commissioner of Patents and Trademarks*